United States Patent
Delfino et al.

(10) Patent No.: US 8,940,457 B2
(45) Date of Patent: Jan. 27, 2015

(54) FLEXIBLE GRAPHITE/METAL DISTRIBUTION PLATE FOR A FUEL CELL ASSEMBLY

(75) Inventors: Antonio Delfino, Grolley (CH); David Olsommer, Le Mont Pellerin (CH); Felix Buchi, Langenthal (CH)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 1288 days.

(21) Appl. No.: 11/970,867

(22) Filed: Jan. 8, 2008

(65) Prior Publication Data

US 2008/0166612 A1    Jul. 10, 2008

(30) Foreign Application Priority Data

Jan. 9, 2007   (FR) ..................... 07 00183

(51) Int. Cl.
*H01M 8/02* (2006.01)
*H01M 8/10* (2006.01)

(52) U.S. Cl.
CPC .......... *H01M 8/0228* (2013.01); *H01M 8/0206* (2013.01); *H01M 8/021* (2013.01);
(Continued)

(58) Field of Classification Search
CPC ............ H01M 8/0204; H01M 8/0213; H01M 8/0223; H01M 8/0273
USPC ......... 429/463, 467–469, 508, 514, 517–522, 429/456–461, 507, 512
See application file for complete search history.

(56) References Cited

U.S. PATENT DOCUMENTS 4,522,895 A * 6/1985 Shigeta et al. ................ 429/508
4,579,789 A * 4/1986 Fukuda et al. ................ 429/514
(Continued)

FOREIGN PATENT DOCUMENTS

EP    1154504    11/2001
EP    1615281    1/2006
(Continued)

OTHER PUBLICATIONS

European Search Report dated Apr. 24, 2008, regarding Application No. EP 07 02 4870.
(Continued)

*Primary Examiner* — Ula C. Ruddock
*Assistant Examiner* — Amanda Barrow
(74) *Attorney, Agent, or Firm* — Fitzpatrick, Cella, Harper & Scinto

(57) ABSTRACT

Fluid distribution plate (1) for a fuel cell assembly, comprising a first plate (11) made of an electrically conductive material impermeable to all the fluids used in a fuel cell assembly, said distribution plate having a useful section (S) which is the surface over which the gases used by the electrochemical reaction are distributed, said useful section (S) being bordered all around by a peripheral section (P), said first plate having a given thickness e1 in the peripheral section and a smaller thickness e2 in the useful section so as to form a recess from the side facing the outer face and so as to have a flat inner surface, a flexible graphite foil (11C) being applied against said first plate (11) over the entire surface of the recess, the visible face of the flexible graphite foil having a distribution channel (111) for one of the fluids, said network being formed completely in the graphite foil.

11 Claims, 5 Drawing Sheets

(52) U.S. Cl.
CPC .......... *H01M 8/0213* (2013.01); *H01M 8/0267* (2013.01); *H01M 8/0263* (2013.01); *H01M 2008/1095* (2013.01); *H01M 2300/0082* (2013.01); *Y02E 60/50* (2013.01)
USPC .......... 429/514; 429/456; 429/457; 429/458; 429/460; 429/461; 429/507; 429/512; 429/518

(56) References Cited

U.S. PATENT DOCUMENTS

| | | | | |
|---|---|---|---|---|
| 4,818,640 | A | * | 4/1989 | Fukuda et al. ............... 429/509 |
| 4,956,245 | A | * | 9/1990 | Shimizu et al. .............. 429/434 |
| 5,300,370 | A | | 4/1994 | Washington et al. |
| 5,460,897 | A | * | 10/1995 | Gibson et al. ................ 429/461 |
| 5,723,228 | A | * | 3/1998 | Okamoto ...................... 429/437 |
| 6,037,074 | A | * | 3/2000 | Mercuri et al. .............. 429/513 |
| 6,042,955 | A | * | 3/2000 | Okamoto ...................... 429/413 |
| 6,066,408 | A | * | 5/2000 | Vitale et al. ................. 429/413 |
| 6,280,870 | B1 | | 8/2001 | Eisman et al. ............... 429/456 |
| 6,329,094 | B1 | * | 12/2001 | Yasuo et al. ................. 429/444 |
| 6,379,476 | B1 | | 4/2002 | Tarutani et al. ............. 148/325 |
| 6,761,990 | B1 | * | 7/2004 | Yoshitake et al. ........... 429/454 |
| 6,864,007 | B1 | | 3/2005 | Iqbal et al. |
| 7,021,661 | B2 | | 4/2006 | Laurent et al. .............. 280/783 |
| 7,094,311 | B2 | * | 8/2006 | Mercuri ....................... 156/307.1 |
| 7,337,799 | B2 | | 3/2008 | Delfino et al. .............. 137/79 |
| 2003/0157391 | A1 | * | 8/2003 | Coleman et al. ........... 429/34 |
| 2003/0203261 | A1 | * | 10/2003 | Rapaport et al. ........... 429/26 |
| 2004/0018412 | A1 | * | 1/2004 | Orsbon et al. .............. 429/37 |
| 2004/0142226 | A1 | * | 7/2004 | Yamauchi et al. .......... 429/38 |
| 2005/0017055 | A1 | * | 1/2005 | Kurz et al. .................. 228/194 |
| 2005/0221158 | A1 | * | 10/2005 | Yamauchi et al. .......... 429/38 |
| 2005/0282055 | A1 | | 12/2005 | Kim |
| 2006/0073372 | A1 | * | 4/2006 | Suh ............................. 429/35 |
| 2006/0101778 | A1 | * | 5/2006 | Yamamoto et al. ........ 52/736.3 |
| 2006/0115737 | A1 | * | 6/2006 | Yoshida et al. ............. 429/247 |
| 2006/0121331 | A1 | * | 6/2006 | Hu et al. ..................... 429/38 |
| 2006/0127741 | A1 | * | 6/2006 | Muller et al. ............... 429/38 |
| 2006/0147787 | A1 | * | 7/2006 | Yamauchi et al. .......... 429/38 |
| 2006/0240308 | A1 | * | 10/2006 | Formanski et al. ......... 429/38 |
| 2006/0280992 | A1 | * | 12/2006 | Miyagawa ................... 429/34 |
| 2007/0154772 | A1 | * | 7/2007 | Chen et al. .................. 429/38 |
| 2008/0047609 | A1 | | 2/2008 | Delfino et al. .............. 137/79 |
| 2008/0124610 | A1 | * | 5/2008 | Kaiser et al. ................ 429/35 |

FOREIGN PATENT DOCUMENTS

| | | | | |
|---|---|---|---|---|
| FR | 2 810 795 | | 12/2001 | |
| JP | 2000-123850 | * | 4/2000 | ............ H01M 8/02 |
| JP | 2000-133282 | * | 5/2000 | ............ H01M 8/02 |
| JP | 2000133282 | | 5/2000 | |
| WO | WO 2005/006472 A1 | | 1/2005 | ............................ 8/2 |
| WO | WO 2006/100029 A1 | | 9/2006 | ............................ 8/2 |

OTHER PUBLICATIONS

U.S. Appl. No. 11/961,618, filed Dec. 20, 2007, Delfino.

* cited by examiner

FLEXIBLE GRAPHITE/METAL DISTRIBUTION PLATE FOR A FUEL CELL ASSEMBLY

BACKGROUND OF THE INVENTION

1. Field of the Invention

The present invention relates to fuel cell assemblies having ion-exchange polymer membranes. More particularly, it relates to the distribution plates for distributing the fluids used in such fuel cell assemblies, that is to say the bipolar plates installed between each of the elementary electrochemical cells and the end plates installed on either side of the stack of the various electrochemical cells.

2. Description of Related Art

The bipolar plates used in fuel cell assemblies fulfill two very different functions. It is known that the fuel cell assembly has to be supplied with fuel gas and with oxidant gas, i.e. with hydrogen and air or pure oxygen respectively, and that the cell must also be cooled, that is to say a coolant such as water must pass through it. One of the functions of the bipolar plates is to allow passage for these various fluids needed for the operation of the fuel cell assembly. Moreover, the bipolar plates also fulfill an electrical function, namely to provide electrical conduction between the anode and the cathode of each of the adjacent electrochemical cells. Now, a fuel cell assembly always consists of a large number of elementary electrochemical cells assembled in series, the elementary electrochemical cells being connected in series, and the nominal voltage of the fuel cell assembly is the sum of the voltages of each elementary electrochemical cell.

These various functions, conveying fluids and conducting electricity, determine the specifications that the materials used for producing these bipolar plates must meet. The materials used must have a very high electrical conductivity. The materials used must also be impermeable to the fluids used and provide very great chemical stability with respect to these fluids.

Furthermore, the bipolar plates must have sufficiently high mechanical properties to allow the juxtaposition of a large number of elementary electrochemical cells and associated bipolar plates and to hold the assembly together by compression between end plates thanks to rods. The bipolar plates must have sufficiently high mechanical properties to withstand this compression. Graphite is commonly used, since this material offers both a high electrical conductivity and chemical inertness to the fluids used. Patent application WO 2005/006472 shows one possible embodiment of such bipolar plates. It may be seen that they consist of the superposition of two relatively rigid graphite sheets with interposition of a foil made of a relatively flexible graphite material so as to accommodate thickness tolerances on the various layers. The graphite sheets include networks of channels needed for distributing the fuel and oxidant gases, that is to say hydrogen and air or pure oxygen, and the channel allowing a coolant such as water to pass through each bipolar plate.

Unfortunately, the rigid components contributing to the construction of the graphite bipolar plates have quite a low impact resistance, in particular during handling when the fuel cell assembly is being assembled. The layer made of the abovementioned flexible graphite material is also most particularly difficult to handle in an industrial situation. All this significantly increases the manufacturing cost of such bipolar plates.

U.S. Pat. No. 6,379,476 proposes to produce bipolar plates made of stainless steel coated on the surface with a passivated film and having carbide inclusions protruding at the surface. According to the applicant of that patent, the proposed product must have a sufficiently low electrical contact resistance in order for bipolar plates to be made therefrom. However, although this solution may have a few advantages over bipolar plates made entirely of graphite, especially as regards mechanical properties, it remains complicated to implement and the electrical resistivity may prove to be too high, especially if the aim is to achieve a very high power density for the fuel cell assembly.

Patent application US 2005/0221158 describes a composite bipolar plate formed from a steel support having a conductive anti-corrosion coating, the channels being formed in a graphite layer pierced in places in order to define the channels. This solution therefore has the same drawbacks as those mentioned in the comment regarding patent application WO 2005/006472.

Other patent applications propose to produce bipolar plates made of non-metallic materials, for example a plastic, because many of these materials are very insensitive to chemical attack due to the gases and to the coolant that are used. One example that may be mentioned is patent application WO 2006/100029.

The use of metal plates as bipolar plates offers many advantages over graphite plates. The main advantage to be mentioned is the superior mechanical strength of metal, which makes it possible to reduce the thicknesses of the plates and to avoid plate cracking problems. The metal combined with a particular surface treatment is a good solution for the cathode side (for chemical reduction reactions). Its corrosion resistance and its conductivity are good. However, on the anode side (for chemical oxidation reactions), even with a good surface treatment, corrosion appears after only a few hundred hours of operation.

The objective of the present invention is to propose an arrangement for a gas distribution plate for an electrochemical cell of a fuel cell assembly that avoids the drawbacks mentioned above, while also being as robust as possible and quite easy to manufacture.

BRIEF DESCRIPTION OF THE INVENTION

The invention proposes a fluid distribution plate for a fuel cell assembly, comprising a first plate made of an electrically conductive material impermeable to all the fluids used in a fuel cell assembly, said distribution plate having a useful section which is the surface over which the gases used by the electrochemical reaction are distributed, said useful section being bordered all around by a peripheral section, said first plate having a given thickness e1 in the peripheral section and a smaller thickness e2 in the useful section so as to define a recess, a flexible graphite foil being applied against said first plate over the entire surface of the recess, the visible face of the flexible graphite foil having a distribution channel for one of the fluids, the channel being formed completely in the graphite foil, so that there is no contact between the channel and the surface of the first plate in the useful section S.

The invention applies of course to bipolar plates, that is to say plates in which one side forms the anode of an elementary electrochemical cell of a fuel cell assembly and the other side forms the cathode of an adjacent elementary electrochemical cell. However, the invention also applies to end plates. In fact, the invention applies each time that it is desired to produce a distribution plate having an internal network of channels intended to convey one of the gases consumed by a fuel cell assembly, or even the coolant.

BRIEF DESCRIPTION OF THE DRAWINGS

The present invention will be better understood thanks to the detailed description of one embodiment illustrated by the appended figures in which.

DETAILED DESCRIPTION OF THE INVENTION

Figure 1:
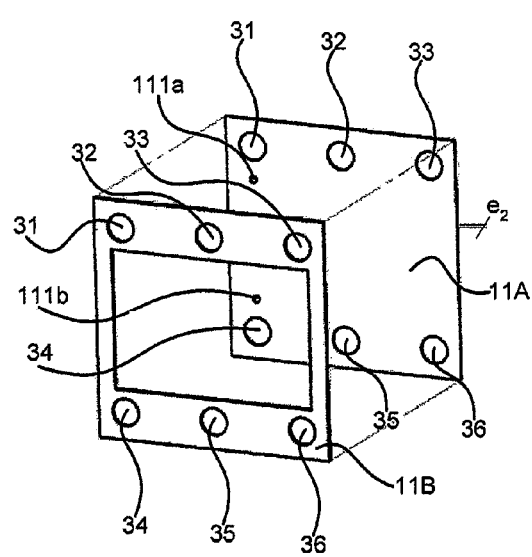
FIG. 1 is an exploded view showing various constituent elements of a distribution plate according to the invention in a first phase of its manufacture.

Let us start by the description of one particular embodiment of a recess in the centre of a distribution plate, this being one of the noteworthy features provided by the present invention. The first plate, that is to say the one that includes a recess for accommodating the flexible graphite foil, is formed from a baseplate 11A and a frame 11B, these being shown in FIG. 1. For the first plate, a metallic material, preferably of stainless steel, is for example used as electrically conductive material impermeable to all the fluids used in a fuel cell assembly. This metallic material gives the distribution plates excellent robustness.

The baseplate 11A and the frame 11B are cut from a flat sheet of stainless steel of appropriate thickness. A sheet of 0.1 mm thickness is used for example for the baseplate 11A. A sheet of 0.6 mm thickness is for example used for the frame 11B. The baseplate 11A and the frame 11B are superposed and fastened together, for example by means of brazing. For further details about the production of the bond between the baseplate 11A and the frame 11B by brazing, the reader is referred below to the description of FIGS. 7 and 8, which explain the production of a bipolar plate by fastening a distribution plate according to the invention to another distribution plate 2 by brazing. These also show, on the baseplate, two holes 111a and 111b that form part of a fluid distribution channel, as will be more clearly explained later.

On one of the sides of the baseplate 11A and of the frame 11B there is a zone having three openings 31, 32 and 33 of relatively large cross section, and also, on the opposite side, another zone also having three openings 34, 35 and 36 of relatively large cross section. All the openings 31, 32, 33 and 34, 35 and 36 respectively are aligned with identical openings made in the various constituent elements of the fuel cell assembly in order to form a feed for conveying the fluids: the openings 31 and 34 for example convey the hydrogen, the openings 33 and 36 for example convey the oxygen and the openings 32 and 35 allow the circulation of a coolant.

Figure 2:
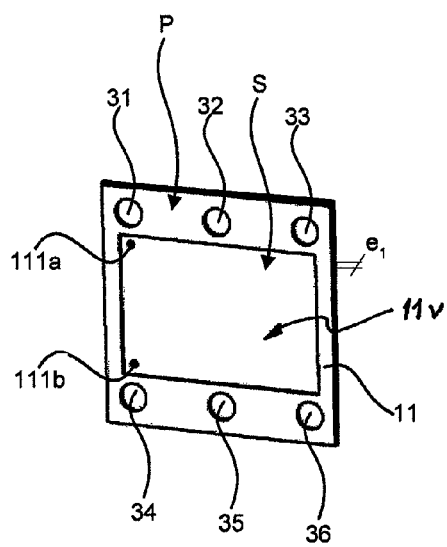
FIG. 2 shows the result obtained at the end of the first manufacturing phase.

The frame constitutes the peripheral section P and the interior of the frame, the area of which corresponds to the useful section S, defines the recess 11v. The assembly of the baseplate 11A with the frame 11B is shown in FIG. 2 and constitutes what is called the first plate 11, which has a given thickness e1 in the peripheral section P. This thickness e1 corresponds to the sum of the thickness of the baseplate 11A and of the frame 11B plus the thickness of the braze, which is in fact negligible if the brazing is carried out by the technique described below. The first plate 11 has a smaller thickness e2 in the useful section S (this is the thickness of the baseplate 11A).

Figure 3:
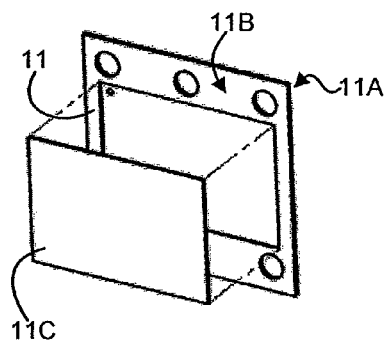
FIG. 3 is an exploded view showing various constituent elements of the distribution plate according to the invention, in a second phase of its manufacture.
Figure 4:
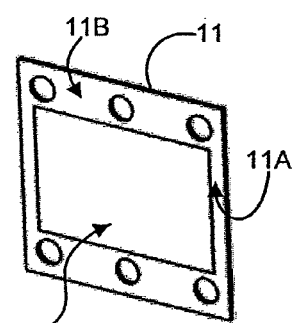
FIG. 4 shows the result obtained at the end of the second manufacturing phase.

FIG. 3 shows a flexible graphite foil 11C that will be applied against said first plate 11, over the entire surface of the recess 11v, in order to obtain the assembly illustrated in FIG. 4. A suitable material for the flexible graphite foil is a 0.5 mm thick foil of "Sigraflex" manufactured by SGL Carbon AG.

Figure 5:
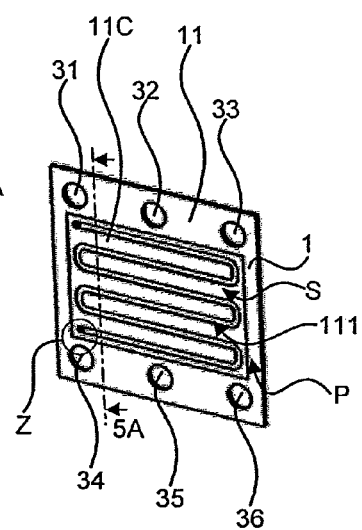
FIG. 5 shows schematically the distribution plate according to the invention in a configuration in which it includes its essential features, which configuration is obtained at the end of a third manufacturing phase.

Finally, or previously moreover, a distribution channel 111 for one of the fluids is impressed in the graphite foil 11C. This may be done by stamping. It may be preferable firstly to form the distribution channel in the graphite foil and then attach the latter in the recess. In all cases, the result illustrated in FIG. 5 is obtained, which constitutes an example of a distribution plate 1 according to the invention.

Figure 5A:
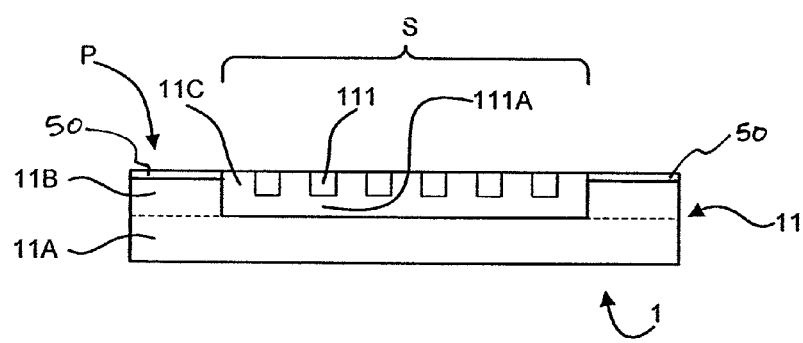
FIG. 5A is a cross section along the axis line in FIG. 5.

Thus, the fluid circulating in the distribution channel 111 is not in contact with the surface of the first plate 11 in the useful section S, as may be seen in FIG. 5A. The distribution channel is formed in the thickness of the graphite foil. A certain thickness 111A of graphite remains, which isolates the channel 111 from the surface of the baseplate 11A. The graphite foil 11C is insensitive or barely sensitive to chemical attack by the fluids likely to be circulating in the distribution channel 111. This offers a wider choice for the material of the first plate 11. In the exemplary embodiment described, steel may be used for the baseplate 11A.

Figure 7:
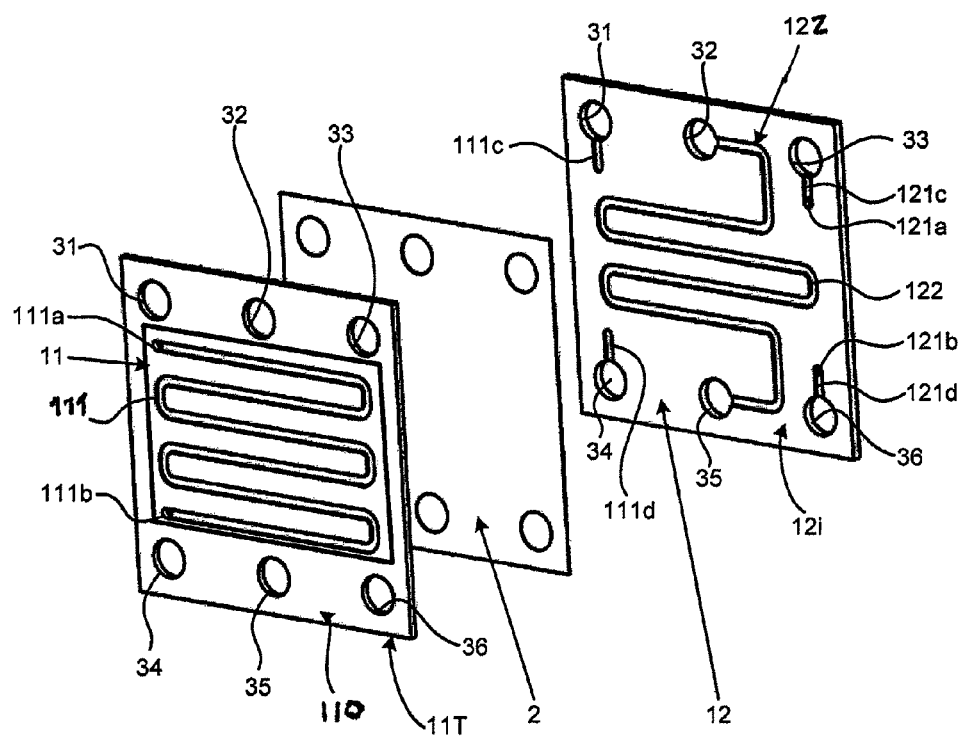
FIG. 7 is an exploded view showing the various constituent elements of a bipolar plate having a distribution plate according to the invention.

Preferably, the outer face 110 of the peripheral section P, i.e. of the frame 11B in the embodiment described here, is covered with an anti-corrosion coating 50 (see FIGS. 5A and 7). It is unnecessary to provide such a coating on the baseplate 11A, as explained above. Preferably, the anti-corrosion coating 50 is electrically non-conductive. In the latter case, there is a great advantage in having the anti-corrosion coating 50 also covering the edge 11T of the distribution plate, as this electrically isolates all the surfaces of the fuel cell assembly which remain accessible from the outside once the fuel cell assembly has been mounted and is in service.

It has been found that if the bottom of the recess Iv is also covered with a thin layer of copper (or nickel or gold), which is then interposed between the first plate 11 and the flexible graphite foil 11C, the electrical conduction between the flexible graphite foil 11C and the first plate 11 is improved thereby.

It should also be noted that the distribution channel 111 terminates at one of its ends in the hole 111a and at the other of its ends in the hole 111b, which holes are produced in the baseplate 11A. To know in what the holes 111a and 111b terminate, the reader is referred below to the description of FIGS. 7 and 8.

Figure 6:
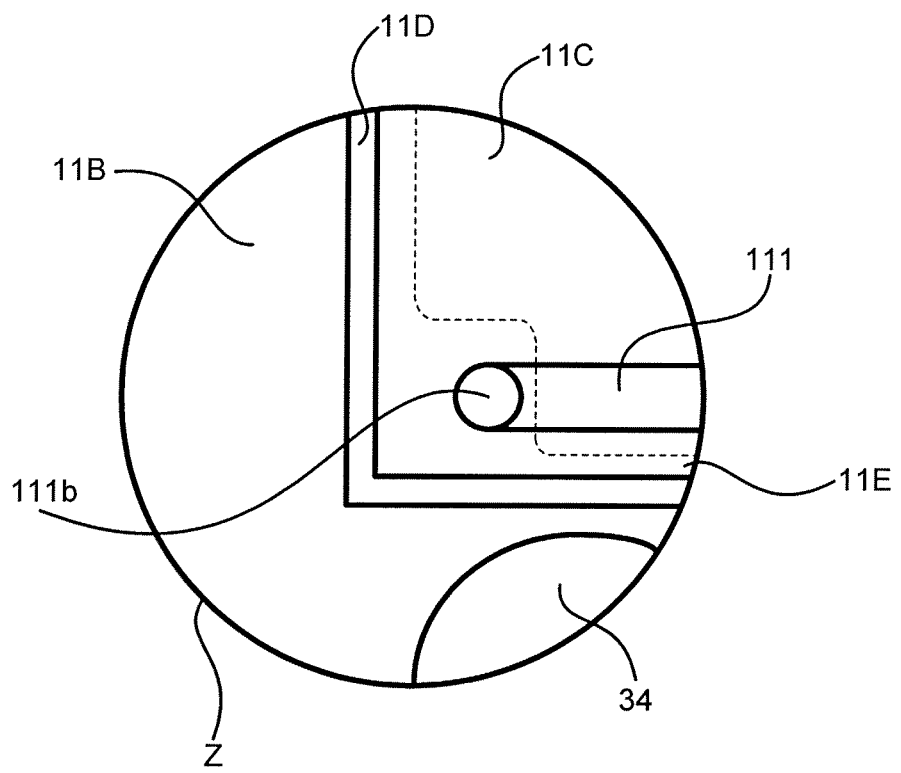
FIG. 6 is an enlargement of the area identified by the circle Z in FIG. 5.

To make the fuel cell assembly even more gastight, the flexible graphite foil 11C preferably has a cross section (i.e. an area) that is slightly smaller than the section S of the recess and the gap between the edges of the flexible graphite foil 11C and the edges of the recess, that is to say the edges of the frame 11B, is filled with a filling material 11D impermeable to the fluid intended to flow in the channels, as may be seen in FIG. 6. This material may be an adhesive, which helps in fastening the flexible graphite foil 11C to the first plate 11. For this purpose, the adhesive is interposed between the flexible graphite foil 11C and said first plate on a surface limited to the periphery 11E of the flexible graphite foil 11C. Most of the appropriate materials (epoxy, silicone) are electrical non-conductors. Surprisingly, it has been observed that it is advantageous for the electrically non-conductive adhesive also to be interposed between the flexible graphite foil and said first plate over the entire perimeter of the fluid inlet and outlet orifices 111b when the distribution plate according to the invention is a plate for distributing gas consumed by the fuel cell assembly. This lowers the current intensity at these places and increases the lifetime of the ion-exchange membranes.

Figure 8:
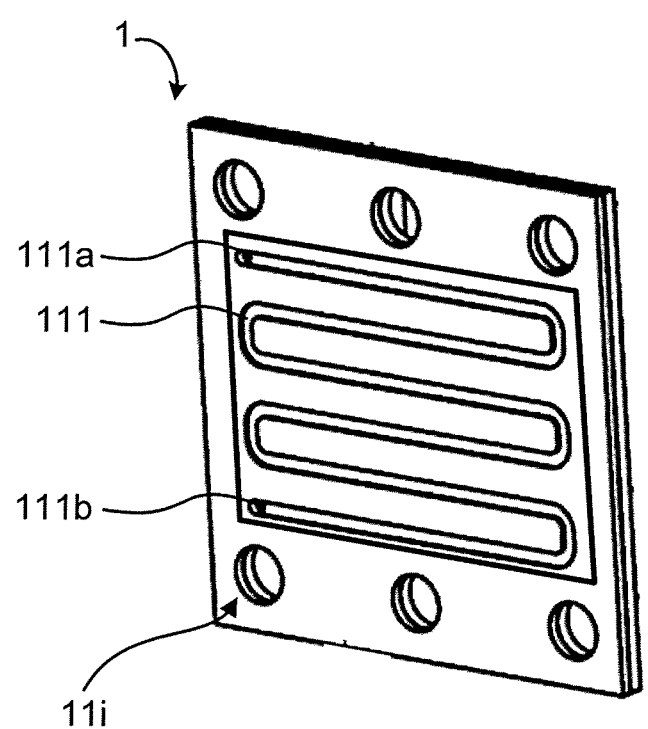
FIG. 8 is a perspective view showing the bipolar plate of FIG. 7 as it appears when it is assembled.

FIGS. 7 and 8 show a bipolar plate 3 formed by assembling a distribution plate 1 according to the invention with another distribution plate 12.

The distribution plate 1 and the distribution plate 12 have three openings 31, 32 and 33 on one side and three openings 34, 35 and 36 on the opposite side. All the openings 31 are aligned from one plate 11 to the other 12. The set of openings 31, 32, 33 and 34, 35 and 36 respectively are aligned. The combination of the openings 31 and 33 forms a feed for conveying one of the gases: the openings 31 and 33 convey in the case of one of them (31) hydrogen and in the case of the other (33) oxygen. The combination of the openings 34 and 36 forms a feed for the return of one of the gases: the openings 34 and 36 provide the return in the case of one of them (34) of the hydrogen not consumed by the fuel cell assembly and in the case of the other (36) of the oxygen not consumed by the fuel cell assembly. Moreover, all the openings 32 form a feed that conveys the coolant, whereas all the openings 35 form a feed that provides the return for the coolant serving to control the temperature of the fuel cell assembly.

One of the faces 12i of the second distribution plate 12 includes an internal channel 122 designed to distribute, over the entire useful section of the second plate 12, the coolant used to control the temperature of the fuel cell assembly. The orifice 111a is aligned with the end of a channel portion 111c hollowed out in the face 12i. The orifice 111b is aligned with the end of a channel portion 111d hollowed out in the same face 12i. Each of these channel portions 111c and 111d communicates with the openings 31 and 34. This provides the communication between the first distribution channel 111 and the feeds in question.

Arranged on the other of the faces (not shown) of the second distribution plate 12 is a second distribution channel similar to the distribution channel 111 and also designed to distribute, over the entire useful section of the second distribution plate 12, the other of the two gases used by the fuel cell assembly. The openings 33 and 36 of the second plate 12 are in communication with, respectively, a channel portion 121c and with a channel portion 121d that are both hollowed out in the face 12i. Each of the channel portions 121c and 121d terminates in an orifice 121a and 121b respectively, which pass through the thickness of the second plate 12 so as to bring the second channel for conveying gas into communication with the feeds in question.

The method of assembly according to the invention is as follows. A brazing sheet (or paste) 2 is interposed between the distribution plate 1 and the second distribution plate 12. One advantageous solution is the use of stainless steel for the distribution plates as already mentioned and the use of copper (either pure or alloyed) for the brazing sheet 2. After the distribution plates 1 and 12 have been brought into contact with the brazing sheet 2, this assembly is heated up to the melting point of the brazing metal and, after cooling, a bipolar plate 3 is obtained comprising, on one face of the channels 111, for example the anode gas circuit, on the other face of the channels the cathode gas circuit, and between the plates of the channels 122, which are not visible after assembly, the coolant circuit. As suggested above, it may therefore be advantageous to use the same brazing technique to assemble the baseplate 11A with the frame 11B in order to form said first plate 11.

A bipolar plate according to the invention is intended to be combined with components forming an electrochemical cell. It is known that an elementary electrochemical cell is at the present time (without this in any way limiting the invention) usually formed from the superposition of five layers: an ion-exchange polymer membrane, two electrodes made of chemical elements necessary for the electrochemical reaction to take place, such as for example platinum, and two gas diffusion layers for ensuring that the gases conveyed by the networks of channels of the bipolar plates are uniformly diffused over the entire surface of the ion-exchange membrane.

Thus, thanks to the invention, it is possible to choose, as constituent base material of each of the distribution plates, an electrically conductive material having sufficiently high mechanical properties for allowing not only the transmission of service stresses for the fuel cell assembly, but also for allowing the manufacture of the distribution plates to be automated. Such automation supposes handling by manufacturing robots, and since such handling requires few precautions thanks to the solidity of the constituent material of the baseplates, the execution of the automatic manufacture will therefore only be simpler, more robust and more economic.

What is claimed is:

1. A fluid distribution plate for a fuel cell assembly, comprising:
    a first plate made of a metal impermeable to fuel fluids used in the fuel cell assembly, the first plate including:
        a useful section, and
        a peripheral section that borders the useful section,
        wherein the first plate has a given thickness in the peripheral section and a smaller thickness in the useful section so as to define a recess; and
    a flexible graphite foil applied against the first plate over the recess,
        wherein a visible face of the flexible graphite foil has a distribution channel including fluid inlet and outlet orifices, the distribution channel being formed of indentations in the flexible graphite foil and positioned within the recess, and the distribution channel being in contact with and distributing the fuel fluids used in the fuel cell assembly, and
        wherein the flexible graphite foil is a single, nonporous layer of graphite that is present between the distribution channel and a surface of the useful section of the first plate to isolate the fuel fluids in the distribution channel from the first plate, with the flexible graphite foil being sufficiently flexible such that the distribution channel is formable by pressing using a stamp.

2. The fluid distribution plate according to claim 1, further comprising an inner face and an outer face, wherein the outer face supports a multilayer electrochemical cell that includes an ion-exchange membrane, wherein the flexible graphite foil is visible from a side facing the outer face, and wherein the distribution channel distributes a first gas consumed by the electrochemical cell.

3. The fluid distribution plate according to claim 1, wherein the first plate is made of stainless steel.

4. The fluid distribution plate according to claim 1, wherein an outer face of the peripheral section is covered with an anti-corrosion coating.

5. The fluid distribution plate according to claim 4, wherein the anti-corrosion coating is electrically non-conductive.

6. The fluid distribution plate according to claim 4, wherein the anti-corrosion coating also covers an edge of the first plate.

7. The fluid distribution plate according to claim 1,
wherein the flexible graphite foil has an area that is smaller than an area of the recess, and
wherein a filling material, impermeable to the fuel fluids flowing through the distribution channel, separates the first plate from a perimeter of the fluid inlet and outlet orifices of the distribution channel, such that the fuel fluids flowing through and contacting the distribution channel do not contact the first plate.

8. The fluid distribution plate according to claim 7, wherein the filling material is an electrically non-conductive adhesive interposed between the flexible graphite foil and the first plate on a surface limited to a periphery of the flexible graphite foil, including over an entire perimeter of the fluid inlet and outlet orifices.

9. The fluid distribution plate according to claim 3, wherein a bottom surface of the recess is covered with a thin layer of copper interposed between the first plate and the flexible graphite foil.

10. The fluid distribution plate according to claim 1, further comprising a second plate made of an electrically conductive material, wherein the second plate includes:
an outer face and an inner face, wherein the inner face of the second plate is applied against an inner face of the first plate, and
a coolant circulation channel that distributes a coolant over the inner face of the second plate,
wherein the first and second plates are joined together by a uniform layer of an electrically conductive connecting material covering the inner faces of the first and second plates, forming a bipolar plate.

11. The fluid distribution plate according to claim 1, wherein the flexible graphite foil is applied against the first plate over an entire surface of the recess.

* * * * *